United States Patent
Hanzawa et al.

(10) Patent No.: US 8,340,866 B2
(45) Date of Patent: Dec. 25, 2012

(54) VEHICLE AND STEERING CONTROL DEVICE FOR VEHICLE

(75) Inventors: Daisuke Hanzawa, Wako (JP); Tetsuo Ikeda, Wako (JP); Kiyozumi Unoura, Wako (JP); Tomoyoshi Aoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1161 days.

(21) Appl. No.: 12/159,102

(22) PCT Filed: Nov. 14, 2006

(86) PCT No.: PCT/JP2006/322618
§ 371 (c)(1),
(2), (4) Date: Jun. 25, 2008

(87) PCT Pub. No.: WO2007/074591
PCT Pub. Date: Jul. 5, 2007

(65) Prior Publication Data
US 2010/0228437 A1 Sep. 9, 2010

(30) Foreign Application Priority Data
Dec. 27, 2005 (JP) .................................. 2005-376444

(51) Int. Cl.
*B62D 6/00* (2006.01)
(52) U.S. Cl. .............. 701/41; 701/23; 701/28; 180/167; 180/168
(58) Field of Classification Search .................. 180/167, 180/168, 169; 701/41, 23, 28
See application file for complete search history.

(56) References Cited

U.S. PATENT DOCUMENTS

| 6,263,270 | B1 * | 7/2001 | Sato et al. ........................ 701/41 |
| 2002/0080235 | A1 * | 6/2002 | Jeon ............................... 348/116 |

FOREIGN PATENT DOCUMENTS

| EP | 1 291 227 A2 | 3/2003 |
| JP | 09-274700 A | 10/1997 |
| JP | 11-147473 A | 6/1999 |
| JP | 2002-334400 A | 11/2002 |
| JP | 2002-340574 A | 11/2002 |
| JP | 2002-362396 A | 12/2002 |
| JP | 2002-367095 A | 12/2002 |
| JP | 2003-40132 A | 2/2003 |
| JP | 2004-237983 A | 8/2004 |
| JP | 2005-329765 A | 12/2005 |

* cited by examiner

*Primary Examiner* — Tony H. Winner
*Assistant Examiner* — Jacob Knutson
(74) *Attorney, Agent, or Firm* — Arent Fox LLP

(57) ABSTRACT

A steering control device for a vehicle has a steering assistance means (7) which performs steering assistance processing for driving an actuator (6) so that a vehicle (1) travels along a lane recognized by a lane recognition means (5) from an image acquired by an image acquisition means (4); a side displacement amount calculation means (8) which calculates a displacement amount in the lane width direction between the position of the vehicle (1) and the center of the recognized lane; a complexity calculation means (10) which calculates the complexity of the acquired image; and a steering assistance inhibition means (11) which inhibits, according to the displacement amount in the lane width direction calculated based on the lane recognized from the acquired image at a given time point and the complexity of the acquired image, steering assistance processing based on the lane by the steering assistance means (7). This prevents inappropriate steering control based on an incorrectly recognized lane when performing the steering control of the vehicle so that the vehicle travels along the lane recognized from the road image.

22 Claims, 6 Drawing Sheets

VEHICLE AND STEERING CONTROL DEVICE FOR VEHICLE

CROSS-REFERENCE TO RELATED APPLICATION

This is a National Stage entry of International Application No. PCT/JP2006/322618, filed Nov. 14, 2006. The disclosure of the prior application is hereby incorporated herein in its entirety by reference.

TECHNICAL FIELD

The present invention relates to a vehicle and a steering control device for a vehicle for recognizing a lane that is recognized by processing an image of a road acquired by an imaging means such as a camera and performing steering control of the vehicle so that the vehicle travels along the recognized lane.

BACKGROUND ART

In recent years, there has been known a technique for detecting a lane mark such as a white line on a road where a vehicle travels by processing an image of the road acquired with an imaging means such as a CCD camera mounted on the vehicle and for performing steering control of the vehicle or providing a driver with information on the basis of information on a lane (traffic lane) along which the vehicle travels recognized from a detection result (refer to, for example, Japanese Patent Laid-Open No. Hei 11-147473/1999) (hereinafter, referred to as Patent Document 1).

The steering force assisting device in Patent Document 1 differentiates, with respect to a plurality of horizontal lines on the image of the road, luminance for each horizontal line from the left in the lateral direction, and extracts a point where luminance changes from dark to light (positive edge point) and a point where luminance changes from light to dark (negative edge point) on the basis of respective peak of the differential values. Then, a combination of edge points, in which the positive edge point and the negative edge point appear in alternate order on each horizontal line and in which the edge points are arranged at intervals that seem to be appropriate for a white line, is extracted as a white line candidate. Then, a white line is detected among the extracted white line candidates on the basis of the positions thereof on the image.

On the road, however, there may be a structure such as, for example, a guard rail besides the lane mark such as the white line. In this case, according to the technique in Patent Document 1, a portion of the guard rail is also extracted as edge points since the portion of the guard rail changes in light and dark on the acquired image. Therefore, the portion of the guard rail is also extracted as a white line candidate and may be detected as a white line. Particularly in the case where a structure such as a guard rail is installed on the road, a lane mark such as a white line defining the lane may be missing in some parts or temporarily invisible. In this case, the portion of the guard rail is more likely to be detected as a white line.

Moreover, the structure such as a guard rail actually has a height and therefore a position where the guard rail is projected on the road surface is detected as a white line in the white line detection. Consequently, if recognizing the lane along which the vehicle travels from the position of the detected white line, the position and width of the lane would be different from that of the actual lane. Accordingly, the conventional device has a problem that the steering control of the vehicle based on the lane recognized in this manner causes inappropriate steering control of the vehicle.

DISCLOSURE OF THE INVENTION

Problem to be Solved by the Invention

It is an object of the present invention to solve the above problem and to provide a vehicle and a steering control device for a vehicle for preventing inappropriate steering control based on an incorrectly recognized lane when performing the steering control of the vehicle so that the vehicle travels along a lane recognized from an image of a road.

Means for Solving the Problem

The present invention has been provided to achieve the above object, and therefore a vehicle according to a first aspect of the present invention comprises: an imaging means; an image acquisition means which acquires an image of a road via the imaging means; a lane recognition means which detects a lane mark on the road from the image acquired by the image acquisition means and recognizes a lane along which the vehicle travels from the detected lane mark; an actuator which drives a steering mechanism capable of steering a steering wheel of the vehicle; a steering assistance means which performs steering assistance processing for driving the actuator so that the vehicle travels along the lane recognized by the lane recognition means; a side displacement amount calculation means which calculates a displacement amount in the lane width direction between the position of the vehicle and the center of the lane recognized by the lane recognition means; and a steering assistance inhibition means which inhibits the steering assistance processing based on the lane by the steering assistance means according to the displacement amount in the lane width direction calculated by the side displacement amount calculation means on the basis of the lane recognized by the lane recognition means from the acquired image from the image acquisition means at a given time point.

Furthermore, a steering control device for a vehicle according to the first aspect of the present invention comprises: an image acquisition means which acquires an image of a road via an imaging means mounted on the vehicle; a lane recognition means which detects a lane mark on the road from the image acquired by the image acquisition means and recognizes a lane along which the vehicle travels from the detected lane mark; an actuator which drives a steering mechanism capable of steering a steering wheel of the vehicle; a steering assistance means which performs steering assistance processing for driving the actuator so that the vehicle travels along the lane recognized by the lane recognition means; a side displacement amount calculation means which calculates a displacement amount in the lane width direction between the position of the vehicle and the center of the lane recognized by the lane recognition means; and a steering assistance inhibition means which inhibits the steering assistance processing based on the lane recognized by the lane recognition means from the acquired image from the image acquisition means at a given time point by the steering assistance means according to the displacement amount in the lane width direction calculated by the side displacement amount calculation means on the basis of the lane.

According to the vehicle and the steering control device for the vehicle of the present invention, the side displacement amount calculation means calculates the displacement amount in the lane width direction between the position of the vehicle and the center of the lane recognized by the lane recognition means. Note that a guard rail may be incorrectly detected as a white line by the lane recognition means in a situation where the guard rail is located on the road along which the vehicle travels. In this case, the white line is incorrectly detected as being located in a position where the guard rail is projected on the road surface. Therefore, the position and width of the lane recognized by the lane recognition means from the position of the detected white line differ from that of the actual lane. On the other hand, the vehicle travels along the actual lane by driver's operations and therefore the position of the vehicle is considered to be near the center of the actual lane. Consequently, in the case where the lane recognized by the lane recognition means differs from the actual lane, a displacement occurs in the lane width direction between the position of the vehicle and the center of the recognized lane.

Therefore, the steering assistance inhibition means inhibits the steering assistance processing based on the lane recognized by the lane recognition means from the acquired image from the image acquisition means at the given time point by the steering assistance means according to the displacement amount in the lane width direction calculated by the side displacement amount calculation means on the basis of the lane, which thereby prevents inappropriate steering control based on the lane incorrectly recognized lane due to a structure such as a guard rail on the road.

More specifically, in the vehicle and the steering control device for the vehicle according to the first aspect of the present invention, the steering assistance inhibition means inhibits the steering assistance processing based on the lane by the steering assistance means in the case where the displacement amount in the lane width direction calculated by the side displacement amount calculation means on the basis of the lane recognized by the lane recognition means from the acquired image from the image acquisition means at a given time point is greater than a first given value.

According to the above, the larger the displacement amount in the lane width direction is, the greater the degree of difference between the lane recognized by the lane recognition means and the actual lane will be. Therefore, in the case where the displacement amount in the lane width direction is large, the situation is determined as follows: it is highly probable that the lane is incorrectly recognized due to a structure such as a guard rail on the road. Accordingly, the steering assistance inhibition means inhibits the steering assistance processing based on the lane by the steering assistance means in the case where the displacement amount in the lane width direction calculated by the side displacement amount calculation means on the basis of the lane recognized by the lane recognition means from the acquired image from the image acquisition means at the given time point is greater than the first given value, which thereby prevents inappropriate steering control based on the lane incorrectly recognized due to the structure such as the guard rail on the road.

Subsequently, a vehicle according to a second aspect of the present invention comprises: an imaging means; an image acquisition means which acquires an image of a road via the imaging means; a lane recognition means which detects a lane mark on the road from the image acquired by the image acquisition means and recognizes a lane along which the vehicle travels from the detected lane mark; an actuator which drives a steering mechanism capable of steering a steering wheel of the vehicle; a steering assistance means which performs steering assistance processing for driving the actuator so that the vehicle travels along the lane recognized by the lane recognition means; a complexity calculation means which calculates the complexity of the image acquired by the image acquisition means; and a steering assistance inhibition means which inhibits the steering assistance processing by the steering assistance means based on the lane recognized by the lane recognition means from the acquired image from the image acquisition means according to the complexity of the acquired image at a given time point calculated by the complexity calculation means.

Furthermore, a steering control device for a vehicle according to the second aspect of the present invention comprises: an image acquisition means which acquires an image of a road via an imaging means mounted on the vehicle; a lane recognition means which detects a lane mark on the road from the image acquired by the image acquisition means and recognizes a lane along which the vehicle travels from the detected lane mark; an actuator which drives a steering mechanism capable of steering a steering wheel of the vehicle; a steering assistance means which performs steering assistance processing for driving the actuator so that the vehicle travels along the lane recognized by the lane recognition means; a complexity calculation means which calculates the complexity of the image acquired by the image acquisition means; and a steering assistance inhibition means which inhibits the steering assistance processing by the steering assistance means based on the lane recognized by the lane recognition means from the acquired image from the image acquisition means according to the complexity of the acquired image at a given time point calculated by the complexity calculation means.

In the vehicle and the steering control device for the vehicle of the present invention, for example, if there is a guard rail on the road along which the vehicle travels, the guard rail may be incorrectly detected as a white line by the lane recognition means. In this case, the white line is incorrectly detected as being located in a position where the guard rail is projected on the road surface. Therefore, the position and width of the lane recognized by the lane recognition means from the position of the detected white line differ from the position and width of the actual lane. Accordingly, in the case where there is a guard rail on the road along which the vehicle travels as described above, it is considered that the number of objects to be detected increases on the acquired image and the complexity of the image thereby increases.

Therefore, the steering assistance inhibition means inhibits the steering assistance processing by the steering assistance means based on the lane recognized by the lane recognition means from the acquired image from the image acquisition means according to the complexity of the acquired image at the given time point calculated by the complexity calculation means, which thereby prevents inappropriate steering control based on the lane incorrectly recognized due to a structure such as the guard rail on the road.

More specifically, in the vehicle and the steering control device for the vehicle according to the second aspect of the present invention, the steering assistance inhibition means inhibits the steering assistance processing by the steering assistance means based on the lane recognized by the lane recognition means from the acquired image from the image acquisition means in the case where the complexity of the acquired image at the given time point calculated by the complexity calculation means is greater than a second given value.

According to the above, the higher the degree of complexity of the image is, the higher the possibility that there is a structure such as a guard rail on the road along which the vehicle travels will be. Therefore, in the case where the degree of complexity of the image is high, the situation is determined as follows: it is highly probable that the lane is incorrectly recognized due to the structure such as the guard rail on the road. Accordingly, the steering assistance inhibition means inhibits the steering assistance processing by the steering assistance means based on the lane recognized by the lane recognition means from the acquired image from the image acquisition means in the case where the complexity of the acquired image at the given time point calculated by the complexity calculation means is greater than the second given value, which thereby prevents inappropriate steering control based on the lane incorrectly recognized due to the structure such as the guard rail on the road.

Subsequently, a vehicle according to a third aspect of the present invention comprises: an imaging means; an image acquisition means which acquires an image of a road via the imaging means; a lane recognition means which detects a lane mark on the road from the image acquired by the image acquisition means and recognizes a lane along which the vehicle travels from the detected lane mark; an actuator which drives a steering mechanism capable of steering a steering wheel of the vehicle; a steering assistance means which performs steering assistance processing for driving the actuator so that the vehicle travels along the lane recognized by the lane recognition means; a side displacement amount calculation means which calculates a displacement amount in the lane width direction between the position of the vehicle and the center of the lane recognized by the lane recognition means; a complexity calculation means which calculates the complexity of the image acquired by the image acquisition means; and a steering assistance inhibition means which inhibits the steering assistance processing based on the lane by the steering assistance means according to the displacement amount in the lane width direction calculated by the side displacement amount calculation means on the basis of the lane recognized by the lane recognition means from the acquired image from the image acquisition means at a given time point and according to the complexity of the acquired image calculated by the complexity calculation means.

Moreover, a steering control device for a vehicle according to the third aspect of the present invention comprises: an image acquisition means which acquires an image of a road via an imaging means mounted on the vehicle; a lane recognition means which detects a lane mark on the road from the image acquired by the image acquisition means and recognizes a lane along which the vehicle travels from the detected lane mark; an actuator which drives a steering mechanism capable of steering a steering wheel of the vehicle; a steering assistance means which performs steering assistance processing for driving the actuator so that the vehicle travels along the lane recognized by the lane recognition means; a side displacement amount calculation means which calculates a displacement amount in the lane width direction between the position of the vehicle and the center of the lane recognized by the lane recognition means; a complexity calculation means which calculates the complexity of the image acquired by the image acquisition means; and a steering assistance inhibition means which inhibits the steering assistance processing based on the lane by the steering assistance means according to the displacement amount in the lane width direction calculated by the side displacement amount calculation means on the basis of the lane recognized by the lane recognition means from the acquired image from the image acquisition means at a given time point and according to the complexity of the acquired image calculated by the complexity calculation means.

According to the vehicle and the steering control device for the vehicle of the present invention, the side displacement amount calculation means calculates the displacement amount in the lane width direction between the position of the vehicle and the center of the lane recognized by the lane recognition means. Note that, for example, if there is a guard rail on the road along which the vehicle travels, the guard rail may be incorrectly detected as a white line by the lane recognition means. Moreover, in this case, the white line is incorrectly detected as being located in a position where the guard rail is projected on the road surface. Therefore, the position and width of the lane recognized by the lane recognition means from the position of the detected white line differ from the position and width of the actual lane. On the other hand, the vehicle travels along the actual lane by driver's operations, and thus the position of the vehicle is considered to be near the center of the actual lane. Consequently, in the case where the lane recognized by the lane recognition means differs from the actual lane, a displacement occurs in the lane width direction between the position of the vehicle and the center of the recognized lane.

The displacement in the lane width direction, however, may occur, for example, in the case where the position of the vehicle is changed by a driver's operation besides the case where the lane is incorrectly recognized. The situation where the lane is incorrectly recognized means a situation where, for example, there is a guard rail on the road along which the vehicle travels, and in this case, it is considered that the number of objects to be detected increases in the acquired image and thereby the complexity of the image increases. On the other hand, if the displacement amount in the lane width direction occurs due to a change in the vehicle position, the change in the complexity of the image is supposed to be low.

Accordingly, the steering assistance inhibition means inhibits the steering assistance processing based on the lane by the steering assistance means according to the displacement amount in the lane width direction calculated by the side displacement amount calculation means on the basis of the lane recognized by the lane recognition means from the acquired image from the image acquisition means at the given time point and according to the complexity of the acquired image calculated by the complexity calculation means, which thereby prevents inappropriate steering control on the basis of the lane incorrectly recognized due to the structure such as the guard rail on the road.

Specifically, in the vehicle and the steering control device for the vehicle according to the third aspect of the present invention, the steering assistance inhibition means inhibits the steering assistance processing based on the lane by the steering assistance means in the case where the displacement amount in the lane width direction calculated by the side displacement amount calculation means on the basis of the lane recognized by the lane recognition means from the acquired image from the image acquisition means at the given time point is greater than a first given value and the complexity of the acquired image calculated by the complexity calculation means is greater than a second given value.

According to the above, the larger the displacement amount in the lane width direction is, the greater the degree of difference between the lane recognized by the lane recognition means and the actual lane will be. In addition, the higher the degree of complexity of the image is, the higher the possibility that there is a structure such as a guard rail on the road along which the vehicle travels will be. Therefore, in the case where the displacement amount in the lane width direction is large and where the degree of complexity of the image is high, the situation is determined as follows: it is highly probable that the lane is incorrectly recognized due to the structure such as the guard rail on the road.

Therefore, the steering assistance inhibition means inhibits the steering assistance processing based on the lane by the steering assistance means in the case where the displacement amount in the lane width direction calculated by the side displacement amount calculation means on the basis of the lane recognized by the lane recognition means from the acquired image from the image acquisition means at the given time point is greater than the first given value and where the complexity of the acquired image calculated by the complexity calculation means is greater than the second given value, which thereby prevents inappropriate steering control on the basis of the lane incorrectly recognized due to the structure such as the guard rail on the road.

In the vehicle and the steering control device for the vehicle according to the second and third aspects of the present invention, the complexity calculation means calculates the complexity by using at least one of a value indicating the density of edge points obtained by performing an edge extraction process for the image and a value indicating the number of edge points constituting a straight line among the edge points.

According to the above, the edge points extracted by performing the edge extraction process for the image are points (pixels) where luminance of the image changes from light to dark or dark to light, and therefore if the value indicating the density of edge points is high, the high value indicates that there are a lot of changes in luminance distribution in the image, by which the image is considered to be complex. Also if the value indicating the number of edge points constituting the straight line among the edge points is high, the high value indicates that there are a lot of line segments in the image, by which the image is considered to be complex. Therefore, it is possible for the complexity calculation means to calculate the complexity by using at least one of the value indicating the density of edge points obtained by performing the edge extraction process for the image and the value indicating the number of edge points constituting the straight line among the edge points.

In the vehicle and the steering control device for the vehicle according to the second and third aspects of the present invention, the complexity calculation means calculates the complexity by multiplying a value indicating the density of edge points obtained by performing an edge extraction process for the image by a value indicating the number of edge points constituting a straight line among the edge points.

According to the above, the higher the value indicating the density of edge points is, the higher the degree of complexity of the image is. In addition, the higher the value indicating the number of edge points constituting the straight line among the edge points is, the higher the degree of complexity of the image is. Therefore, the product of the value indicating the density of edge points and the value indicating the number of edge points constituting the straight line among the edge points is considered to indicate the complexity of the image more remarkably. Accordingly, it is possible for the complexity calculation means to calculate the complexity more appropriately by multiplying the value indicating the density of edge points obtained by performing the edge extraction process for the image by the value indicating the number of edge points constituting the straight line among the edge points.

Moreover, in the vehicle and the steering control device for the vehicle according to the second and third aspects of the present invention, there is provided a range specifying means which specifies a detection range of the lane mark in the image acquired by the image acquisition means and the complexity calculation means calculates the complexity for the detection range specified by the range specifying means in the image acquired by the image acquisition means.

According to the above, the range specifying means specifies the detection range of the lane mark in the image acquired by the image acquisition means. The detection range of the lane mark is, for example, a range set on the assumption that the road occupies the range in the image. In this situation, it is supposed that the change in complexity of the image will be significant since various objects around the road are imaged in the portions of the image outside the detection range. On the other hand, a paved road occupies a large part of the portion of the image in the detection range and accordingly the change in complexity of the road surface image is considered to be low. Therefore, the complexity calculation means calculates the complexity for the detection range of the image, by which it is possible to calculate the complexity more remarkably indicating the existence of the structure such as the guard rail on the road while removing the effect of the surroundings outside the lane mark detection range.

Moreover, in the vehicle and the steering control device for the vehicle according to the first and third aspects of the present invention, the side displacement amount calculation means calculates the displacement amount in the lane width direction by dividing a distance in the lane width direction between the position of the vehicle and the center of the lane recognized by the lane recognition means by a lane width of the recognized lane.

According to the above, the value, which is calculated as the displacement amount in the lane width direction by the side displacement amount calculation means by dividing the distance in the lane width direction between the position of the vehicle and the center of the lane recognized by the lane recognition means by the lane width of the recognized lane, is a value indicating the degree of relative displacement of the vehicle position in the lane width direction with respect to the lane width. Therefore, it is possible to know the degree of displacement in the lane width direction from this value.

BEST MODE FOR CARRYING OUT THE INVENTION

One embodiment of the present invention will be described below with reference to the accompanying drawings. This embodiment corresponds to the steering control device for the vehicle according to the third aspect of the present invention.

Figure 1:
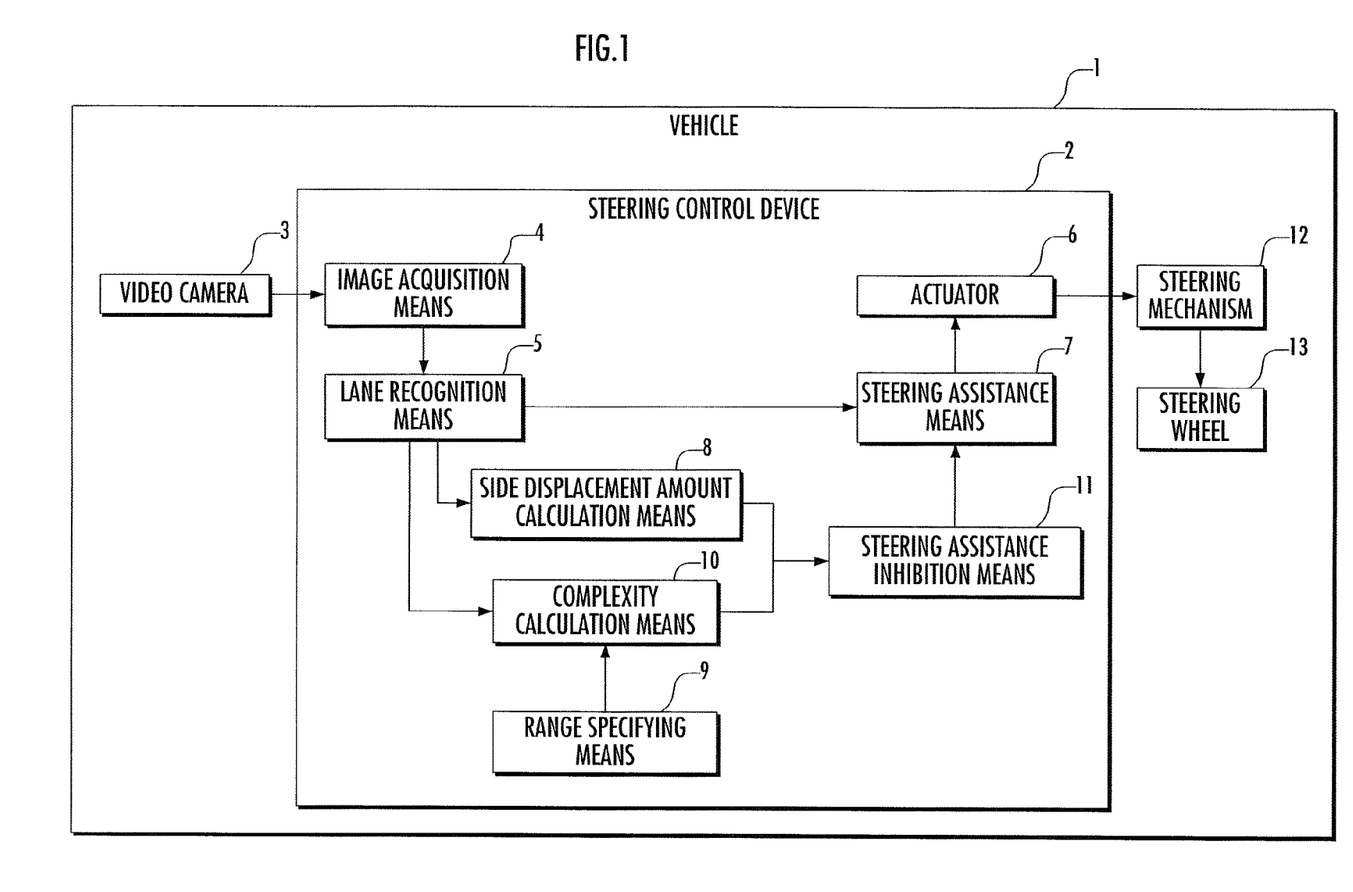
FIG. 1 is a functional block diagram of a steering control device for a vehicle according to a first embodiment of the present invention.

Referring to FIG. 1, a steering control device 2 is an electronic unit containing a microcomputer and is mounted on a vehicle 1, including an image acquisition means 4 which acquires a road image through a video camera 3 mounted on the vehicle 1, a lane recognition means 5 which recognizes a lane along which the vehicle 1 travels from the image acquired by the image acquisition means 4, an actuator 6 which drives a steering mechanism 12 capable of steering a steering wheel 13 of the vehicle 1, and a steering assistance means 7 which performs steering assistance processing for driving the actuator 6 so that the vehicle 1 travels along the lane recognized by the lane recognition means 5.

Moreover, the steering control device 2 includes a side displacement amount calculation means 8 which calculates a displacement amount in the lane width direction between the position of the vehicle 1 and the center of the lane recognized by the lane recognition means 5, a range specifying means 9 which specifies a detection range of the lane mark in the image acquired by the image acquisition means 4, a complexity calculation means 10 which calculates the complexity of the image acquired by the image acquisition means 4, and a steering assistance inhibition means 11 which inhibits the steering assistance processing by the steering assistance means 7 according to the displacement amount in the lane width direction and the complexity.

The image acquisition means 4 acquires a road image composed of pixel data through the video camera 3 (the imaging means of the present invention such as a CCD camera) which is attached to the front of the vehicle 1 to capture the image in front of the vehicle 1. The vehicle of the present invention is equipped with the video camera 3 and the steering control device 2.

The lane recognition means 5 detects a lane mark which defines the lane (the traffic lane of the vehicle 1) along which the vehicle 1 travels on the road by processing the image acquired by the image acquisition means 4. Then, the lane recognition means 5 recognizes the lane along which the vehicle 1 travels from the detected lane mark. As for a technique for recognizing a lane by detecting a lane mark, for example, it is possible to use a technique, for example, as described in Japanese Patent No. 3429167 by the present applicant.

The actuator 6 is a motor, and a torque (steering assist torque) generated by driving the actuator 6 is transmitted to the steering wheel 13 via the steering mechanism 12, together with a torque (driver steering torque) input by a driver's manual operation via a steering handle (not shown) provided in the steering mechanism 12 of the vehicle 1, so as to turn the steering wheel 13.

The steering assistance means 7 performs steering assistance processing for driving the actuator 6 so that the vehicle 1 travels along the lane recognized by the lane recognition means 5. The steering assistance means 7 sets a desired yaw rate so that the vehicle 1 travels along the recognized lane on the basis of the position and curvature of the lane and the like recognized by the lane recognition means 5 and the current position and vehicle speed of the vehicle 1 and the like in the steering assistance processing as described in the foregoing Japanese Patent No. 3429167. Thereafter, the steering assistance means 7 calculates a steering assist torque which assists the driver steering torque input into the steering mechanism 12 so as to eliminate a difference between the desired yaw rate and an output of a yaw rate sensor (not shown) provided in the vehicle 1. Then, the steering assistance means 7 calculates a command value for causing the actuator 6 to generate the calculated steering assist torque, outputs the command value to the actuator 6, and drives the actuator 6 on the basis of the command value.

The side displacement amount calculation means 8 calculates a displacement amount (side displacement amount) in the lane width direction between the position of the vehicle 1 and the center of the lane recognized by the lane recognition means 5. In this calculation, the side displacement amount calculation means 8 calculates the displacement amount in the lane width direction by dividing the distance in the lane width direction between the position of the vehicle 1 and the center of the lane recognized by the lane recognition means 5 by the lane width of the recognized lane.

The range specifying means 9 specifies a detection range of the lane mark in the image acquired by the image acquisition means 4. Note that the detection range is previously determined on the assumption that the road occupies the range in the image.

The complexity calculation means 10 calculates the complexity of the image acquired by the image acquisition means 4. In this calculation, the complexity calculation means 10 calculates the complexity of the image by multiplying a value indicating the density of edge points included in the detection range specified by the range specifying means 9 by a value indicating the number of edge points constituting a straight line among the edge points included in the detection range after performing an edge extraction process for the image.

The steering assistance inhibition means 11 inhibits the steering assistance processing based on the lane performed by the steering assistance means 7 if the displacement amount in the lane width direction calculated by the side displacement amount calculation means 8 is greater than a first given value and the complexity of the acquired image calculated by the complexity calculation means 10 is greater than a second given value on the basis of the lane recognized by the lane recognition means 5 from the image acquired by the image acquisition means 4.

Subsequently, the operation (steering control processing) of the steering control device 2 of the vehicle 1 according to this embodiment will now be described with reference to the flowchart shown in FIG. 2. The following description is given taking an example where the traveling direction of the vehicle 1 is indicated by an arrow as shown in FIG. 3(*a*), the right side of the lane of the road along which the vehicle 1 is traveling is defined by a lane mark A0, and a guard rail A2 is provided on the left side of the lane. This situation will occur in the case where the lane is temporarily controlled narrower by using a structure such as a guard rail, for example, in a construction zone on a road. In the example shown in FIG. 3(*a*), a lane mark that defines the left side of the lane is not provided, but a virtual lane mark A1*a* is indicated by a dotted line in a position where the lane mark that defines the left side of the lane should be located. In addition, the lane mark is assumed to be a white line in this embodiment.

Figure 2:
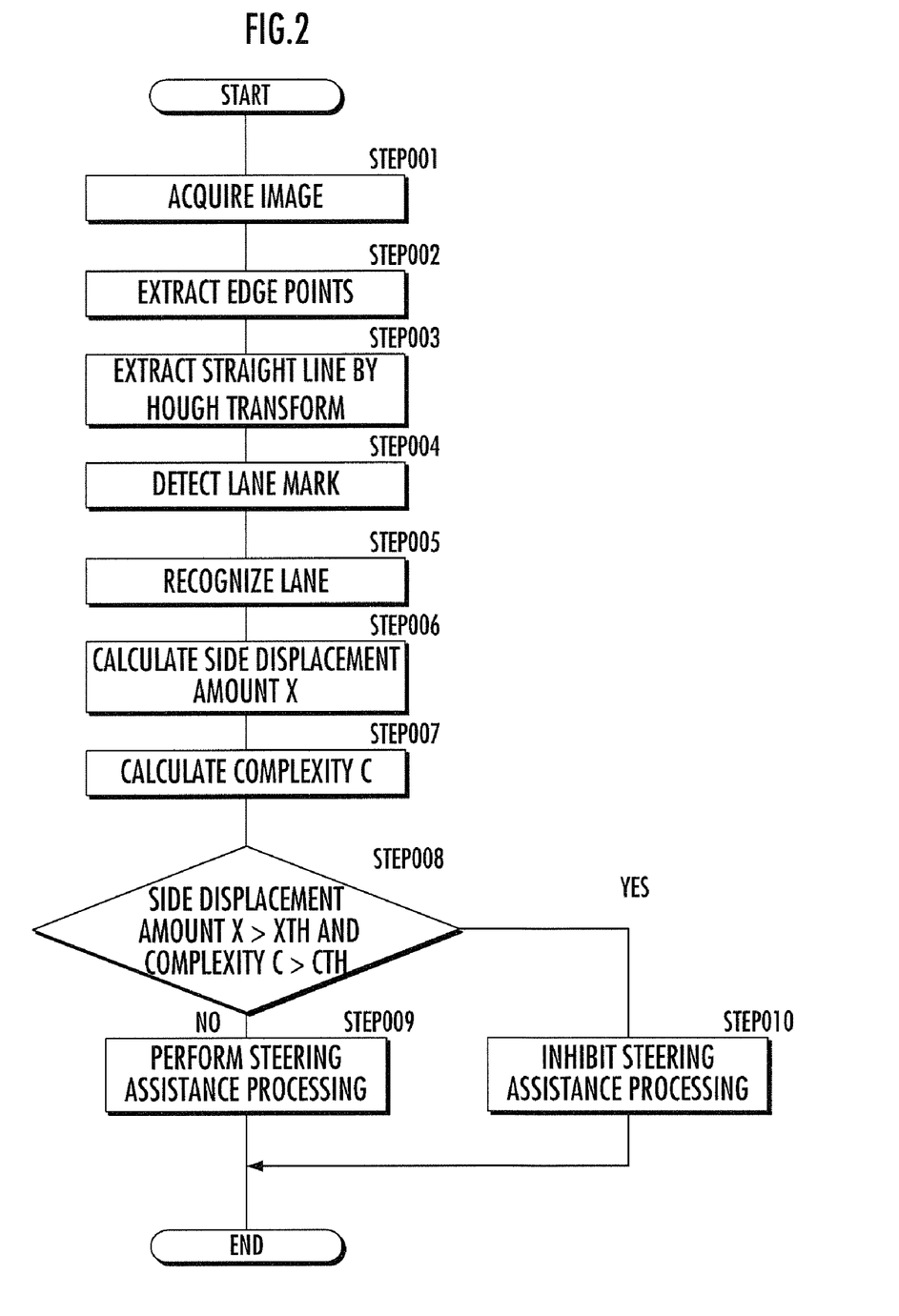
FIG. 2 is a flowchart illustrating steering control processing of the steering control device for a vehicle in FIG. 1.
Figure 3A:
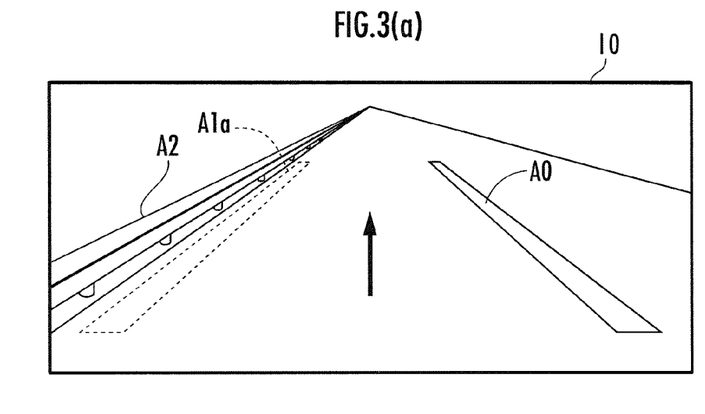
FIG. 3 is an illustrative diagram of a processed image in the steering control processing in FIG. 2.

Referring to FIG. 2, first the image acquisition means 4 acquires an image I0 of a road composed of pixel data by inputting a video signal output from the video camera 3 (step 001). Note that the image I0 is as illustrated in FIG. 3(*a*). The steering control device 2 of the vehicle 1 performs a lane mark detection process of steps 001 to 010 in FIG. 2 for each given control cycle. The timing for acquiring the image in step 001 in each control cycle corresponds to the given time point of the present invention.

Figure 3B:
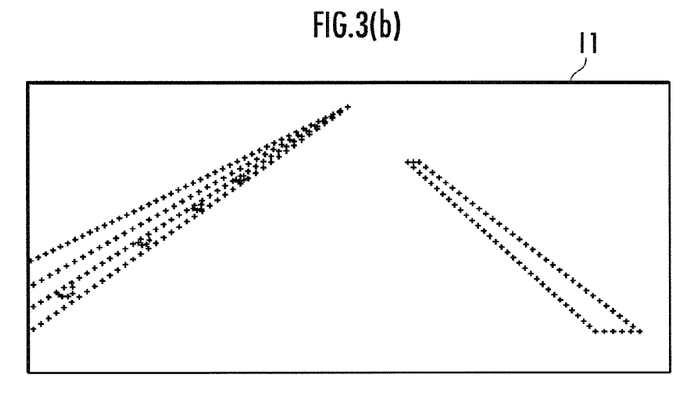

Next in step 002, the lane recognition means 5 extracts edge points by performing an edge extraction process for the acquired image I0. Thereby, the edge points on the image I0 are extracted as illustrated in an image I1 in FIG. 3(*b*).

Figure 3C:
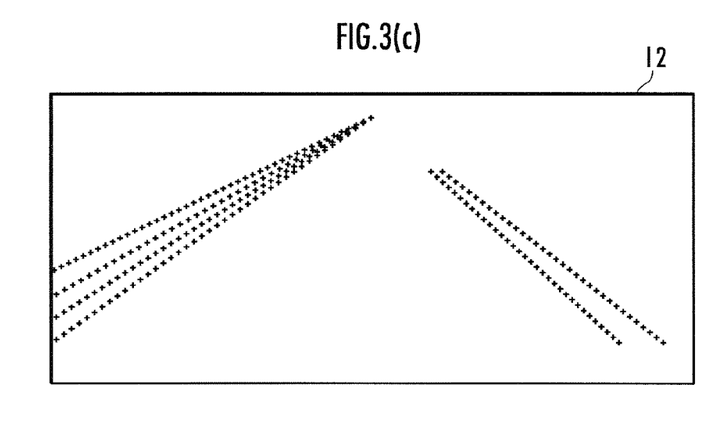

Next in step 003, the lane recognition means 5 extracts straight line components constituting a white line from data on the extracted edge points. First, the lane recognition means 5 Hough-transforms the data on the extracted edge points. Then, the lane recognition means 5 searches the Hough space for the straight line components and extracts the straight line components. Thereafter, the lane recognition means 5 performs projective transformation of data on the extracted straight line components from the Hough space to the image space. This allows the extraction of the edge points (data on the straight line components) constituting the straight line among the edge points on the image I1 as illustrated in an image I2 in FIG. 3(c).

Figure 3D:
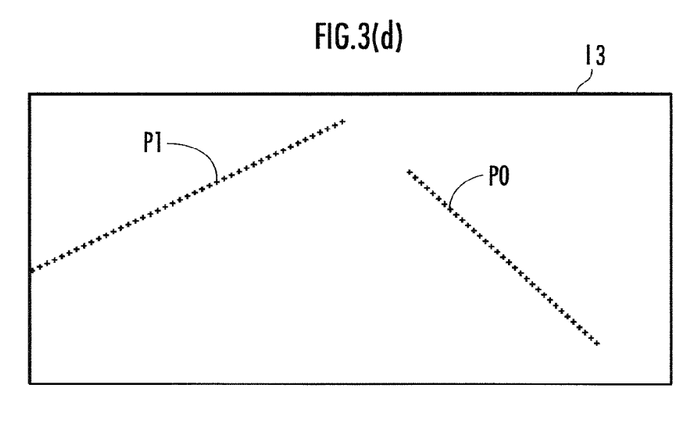

Next in step 004, the lane recognition means 5 detects a lane mark that defines the lane along which the vehicle 1 travels from the data on the extracted straight line components. First, the lane recognition means 5 performs the projective transformation of the data on the extracted straight line components from the image space to the real space. Then, the lane recognition means 5 selects data on the straight line components estimated to be a white line that defines the right side of the lane out of the data on the straight line components transformed to the real space and sets coordinates of a plurality of points included in the selected data on the straight line components as point sequence data P0. Similarly, the lane recognition means 5 selects data on the straight line components estimated to be a white line that defines the left side of the lane and sets coordinates of a plurality of points included in the selected data on the straight line components as point sequence data P1. Thereby, as illustrated in an image I3 in FIG. 3(d), the point sequence data P0 and P1 of the data on the straight line components on the image I2 are detected as white lines A0 and A1b.

Figure 4:
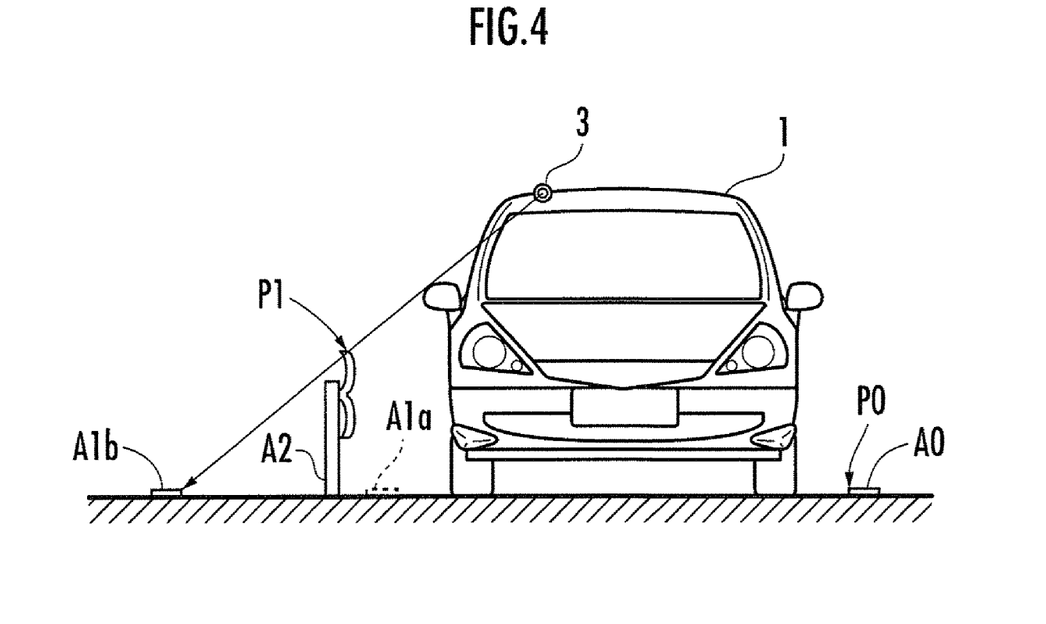
FIG. 4 is an explanatory diagram on a process of detecting a lane mark in the steering control processing in FIG. 2.

The following now describes the positional relationship in the real space between the virtual white line A1a that defines the left side of the actual lane and the white line A1b detected by the lane recognition means 5 from the image I0 with reference to FIG. 4. FIG. 4 shows the outline of the road along which the vehicle 1 travels, viewed from the front side of the vehicle 1. Referring to FIG. 4, the point sequence data P0 detected by the lane recognition means 5 corresponds to an edge portion of the white line A0 and thus the white line A0 is correctly detected. On the other hand, the point sequence data P1 corresponds to an edge portion of the top end of the guard rail A2 and the guard rail A2 is incorrectly detected as a white line A1b. Moreover, in this case, the detected white line A1b is incorrectly detected as being located in a position where the top end of the guard rail A2 is projected on the road surface with the video camera 3 as a base point, which is different from the position of the virtual white line Ala, as shown in FIG. 4.

Next in step 005, the lane recognition means 5 recognizes the lane along which the vehicle 1 travels from the detected white lines A0 and A1b. More specifically, the lane recognition means 5 calculates the coordinates of the point sequence on the center line CLb of the lane and the lane width W at each point from the selected point sequence data P0 and P1. The lane recognized by the lane recognition means 5 in step 005 is provisional (a lane candidate) and it is determined in step 008 described later whether the lane recognized by the lane recognition means 5 in step 005 is an actual lane along which the vehicle 1 travels.

Next in step 006, the side displacement amount calculation means 8 calculates a side displacement amount X between the position of the vehicle 1 at a given time point and the center of the lane recognized by the lane recognition means 5 from the image I0.

Figure 5:
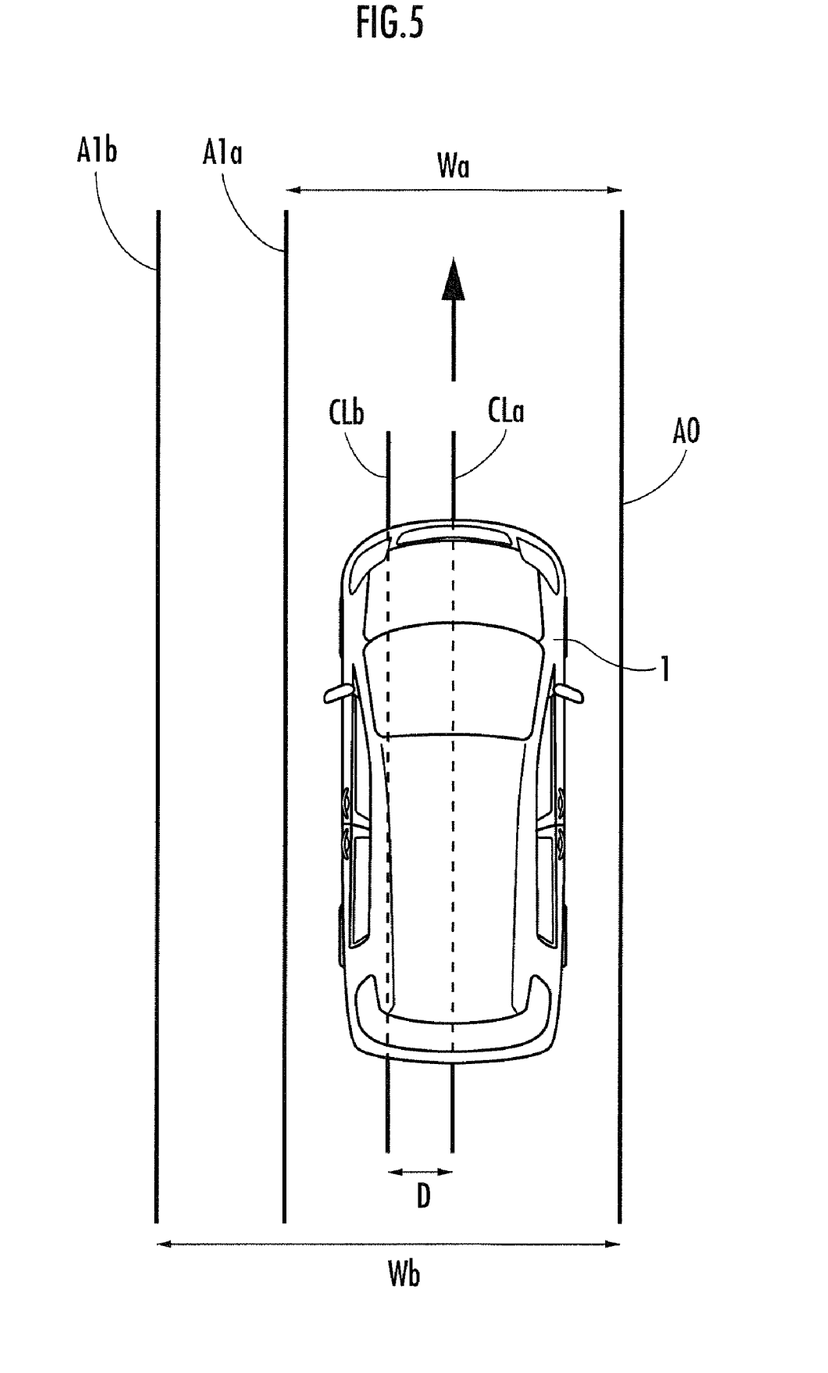
FIG. 5 is an explanatory diagram on a process of calculating a displacement amount in the steering control processing in FIG. 2.

The following describes the calculation of the side displacement amount X with reference to FIG. 5. FIG. 5 shows the outline of the vehicle 1 and the road along which the vehicle 1 travels, viewed from above the vehicle 1. In FIG. 5, the positions of the white lines A0 and A1b, the virtual white line A1a, the center line CLa of an actual lane, and the center line CLb of the lane recognized by the lane recognition means 5 are indicated by solid lines, respectively. Referring to FIG. 5, the vehicle 1 is traveling by driver's operations in the direction indicated by an arrow on the center line CLa of the actual lane defined by the white line A0 and the virtual white line A1a at the given time point. On the other hand, the center line CLb and lane width Wb of the lane recognized by the lane recognition means 5 differ from the center line CLa and lane width Wa of the actual lane as shown. In this situation, the side displacement amount calculation means 8 calculates the side displacement amount X which indicates the degree of difference between the recognized lane and the actual lane by dividing the distance D between the center line CLa and the center line CLb by the lane width Wb.

Next in step 007, the complexity calculation means 10 calculates the complexity of the image I0. First, the complexity calculation means 10 calculates a density M of edge points included in a detection range R which is within the image I0 and is previously specified by the range specifying means 9. Then, the complexity calculation means 10 calculates the number L of edge points constituting a straight line among the edge points included in the detection range R of the image I0. Subsequently, the complexity calculation means 10 calculates the complexity of the image 10 from the complexity $C=M \times L$.

Figure 6A:
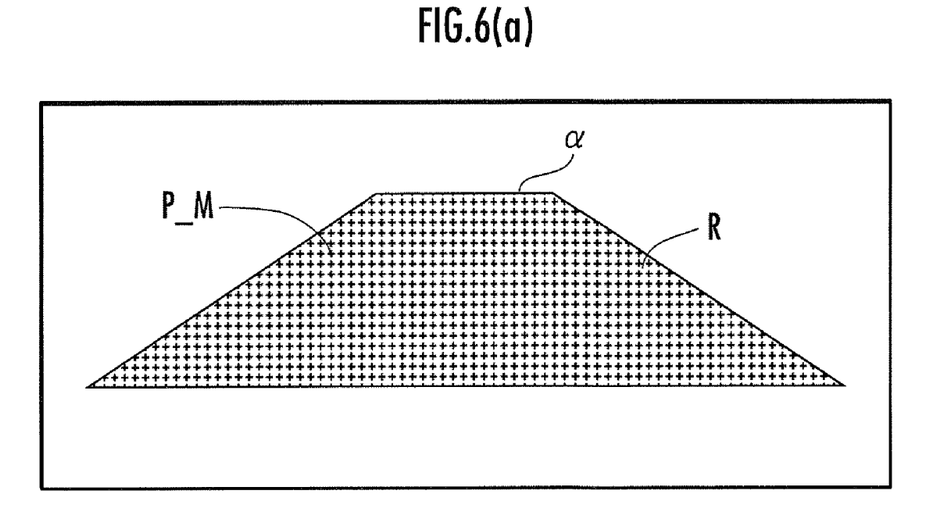
FIG. 6 is an explanatory diagram on a process of calculating the complexity in the steering control processing in FIG. 2.
Figure 6B:
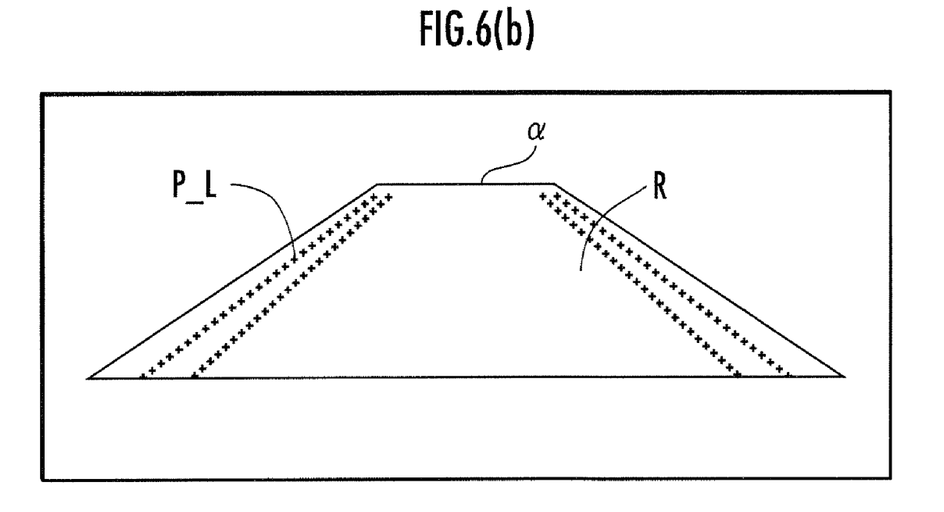

Then, the value M and the value L will be described with reference to the images shown in FIG. 6(a) and FIG. 6(b). In FIGS. 6(a) and 6(b), the detection range R is set to a range enclosed by a solid line α. Edge points P_M in the image shown in FIG. 6(a) schematically show the edge points extracted by the edge extraction process from the image, and the density of the edge points P_M is a value M. A great value M indicates that there are a lot of variations in luminance distribution in the image and therefore the image is considered to be complex. Edge points P_L in the image shown in FIG. 6(b) schematically show edge points constituting a straight line among the extracted edge points, and the number of edge points P_L is a value L. A great value L indicates that there are a lot of line segments in the image and therefore the image is considered to be complex.

In the image I0 illustrated in FIG. 3(a), the value M indicates the density of edge points included in the detection range R of the image I1 calculated in step 002. The value L indicates the number of edge points constituting the straight line components included in the detection range R of the image I2 calculated in step 003. In this situation, the guard rail A2 is a three-dimensional structure which is not flat and a captured image of the guard rail A2 includes a lot of portions where luminance changes. Therefore, the number of edge points and straight line components extracted from the guard rail A2 portion is generally large in comparison with the number of edge points and straight line components extracted from a flat white line in the images I1 and I2. Accordingly, it is possible to recognize the existence of the guard rail A2 on the road on the basis of the complexity C which is obtained by the product of the value M and the value L.

The detection range R is set on the assumption of a range including only the road portion in the image I0. Thereby, it is possible to obtain the complexity C in such a way as to indicate the existence of the guard rail A2 more prominently without an effect of the change in complexity of portions outside the detection range R of the image I0 by calculating the complexity C for the detection range R of the image I0 as described above.

Next in step 008, the steering assistance inhibition means 11 determines whether the side displacement amount X is greater than a given value Xth and the complexity C is greater than a given value Cth. The given value Xth is predetermined as a side displacement amount by which the lane is supposed to be recognized incorrectly. In addition, a given value Cth is predetermined as complexity by which the structure such as a guard rail is supposed to exist on the road. Thereby, it is possible to determine whether it is highly probable that the structure such as a guard rail on the road is incorrectly detected as a white line.

If the determination result of step 008 is YES, it is highly probable that the structure such as a guard rail on the road is incorrectly detected as a white line, and this situation corresponds to a case where the lane recognized by the lane recognition means 5 differs from the actual lane along which the vehicle 1 travels as shown in FIG. 4. Thus, in this case, the lane recognized by the lane recognition means 5 in step 005 is determined not to be an actual lane along which the vehicle 1 is traveling and then the control proceeds to step 010, where the steering assistance inhibition means 11 inhibits the steering assistance processing based on the lane different from the actual lane by the steering assistance means 7. This prevents inappropriate steering control based on the lane recognized from the incorrectly detected white line A1$b$.

On the other hand, if the determination result of step 008 is NO, there is a low probability that the structure such as a guard rail on the road is incorrectly detected as a white line and it is considered that the lane mark defining the lane is correctly detected from the image acquired by the image acquisition means 4 and thus the lane recognition means 5 appropriately recognizes the actual lane. In this situation, the lane recognized by the lane recognition means 5 in step 005 is determined to be an actual lane along which the vehicle 1 is traveling and then the control proceeds to step 009, where the steering assistance means 7 performs the steering assistance processing based on the lane recognized by the lane recognition means 5.

According to the above processing, it is possible to prevent inappropriate steering control based on the lane incorrectly recognized from the guard rail A2 located on the road when the steering control of the vehicle 1 is performed so that the vehicle 1 travels along the lane recognized from the road image.

While the complexity calculation means 10 calculates the complexity C by the product of the value M indicating the density of edge points and the value L indicating the number of edge points constituting the straight line among the edge points in this embodiment, it is also possible to calculate the complexity C in another method by using both of the value M and the value L or one of the value M and the value L. Also in this case, both of the value M and the value L are adaptable to the complexity of the image and therefore the complexity of the image is calculated appropriately.

Moreover, while the complexity calculation means 10 calculates the complexity C of the image 10 for the detection range R of the image 10 with the range specifying means 9 provided in this embodiment, it is also possible to calculate the complexity C of the image 10 for the total range of the image 10 without the range specifying means 9 as another embodiment. If this is the case, the value M is calculated from the density of edge points included in the total range of the image I1 and the value L is calculated from the number of edge points constituting the straight line components included in the total range of the image I2.

Moreover, while the range specifying means 9 sets the detection range R on the assumption of a range including only the road portion in the image 10 in this embodiment, the range specifying means 9 may set as the detection range R, for example: (a) the left side of the range including only the road portion in the image I0; (b) the right side of the range including only the road portion in the image I0; (c) the front side of the range including only the road portion in the image I0; and (d) the back side of the range including only the road portion in the image I0, as another embodiment. Furthermore, as still another embodiment, the range specifying means 9 may set a plurality of ranges in the image I0 as the detection range R and the complexity calculation means 10 may calculate the complexity of the image I0 on the basis of the complexities calculated for the respective ranges.

Moreover, while the steering assistance inhibition means 11 inhibits the steering assistance processing in the case where the side displacement amount X is greater than the given value Xth and the complexity C is greater than the given value Cth with both of the side displacement amount calculation means 8 and the complexity calculation means 10 provided in this embodiment, the steering assistance inhibition means 11 may inhibit the steering assistance processing in the case where the side displacement amount X is greater than the given value Xth with only the side displacement amount calculation means 8 provided as another embodiment (this corresponds to the steering control device for the vehicle according to the first aspect of the present invention). Alternatively, as still another embodiment, the steering assistance inhibition means 11 may inhibit the steering assistance processing in the case where the complexity C is greater than the given value Cth with only the complexity calculation means 10 provided (this corresponds to the steering control device for the vehicle according to the second aspect of the present invention).

While a structure such as a guard rail has been given as an example of an object to be incorrectly detected as a lane mark such as a white line in this embodiment, a track (wheel track) of a traveling wheel on the road or a puddle reflecting light on the road is also conceivable.

While the white line has been detected as a lane mark in this embodiment, it is also possible to attain the effect of the present invention in a situation where other types of lane mark (a yellow line, Botts Dots, cat's eyes, etc.) are to be detected.

INDUSTRIAL APPLICABILITY

As described hereinabove, the present invention is adapted for use in controlling vehicle behaviors since according to the invention it is possible to prevent inappropriate steering control based on an incorrectly recognized lane by processing the image of the road in front of the vehicle.

The invention claimed is:
1. A vehicle comprising:
an imaging means;
an image acquisition means which acquires an image of a road via the imaging means;
a lane recognition means which detects a lane mark on the road from the image acquired by the image acquisition means and recognizes a lane along which the vehicle travels from the detected lane mark;
an actuator which drives a steering mechanism capable of steering a steering wheel of the vehicle;
a steering assistance means which performs steering assistance processing for driving the actuator so that the vehicle travels along the lane recognized by the lane recognition means;
a side displacement amount calculation means which calculates a displacement amount in the lane width direction between the position of the vehicle and the center of the lane recognized by the lane recognition means by dividing a distance in the lane width direction between the position of the vehicle and the center of the lane recognized by the lane reconition means by a lane width of the recognized lane; and a steering assistance inhibition means which inhibits the steering assistance processing based at least in part on the calculated displacement amount.

2. The vehicle according to claim 1, wherein the steering assistance inhibition means inhibits the steering assistance processing upon determining the calculated displacement amount at a time point is greater than a predetermined value representing the lane is recognized incorrectly.

3. A vehicle comprising:
an imaging means;
an image acquisition means which acquires an image of a road via the imaging means;
a lane recognition means which detects a lane mark on the road from the image acquired by the image acquisition means and recognizes a lane along which the vehicle travels from the detected lane mark;
an actuator which drives a steering mechanism capable of steering a steering wheel of the vehicle;
a steering assistance means which performs steering assistance processing for driving the actuator so that the vehicle travels along the lane recognized by the lane recognition means;
a complexity calculation means which calculates the complexity of the image acquired by the image acquisition means by using at least one of a value indicatin the density of edge points obtained by performing an edge extraction process for the image and a value indicating the number of edge points constituting a straight line among the edge points; and
a steering assistance inhibition means which inhibits the steering assistance processing by the steering assistance means based at least in part on the calculated complexity of the acquired image.

4. The vehicle according to claim 3, wherein the steering assistance inhibition means inhibits the steering assistance processing by the steering assistance means upon determining the calculated complexity of the acquired image at a time point is greater than a predetermined value representing a structure in a vicinity of the lane mark and incorrectly recognized as a part of the lane.

5. The vehicle according to claim 3, wherein the complexity calculation means calculates the complexity by multiplying a value indicating the density of edge points obtained by performing an edge extraction process for the image by a value indicating the number of edge points constituting a straight line among the edge points.

6. The vehicle according to claim 3, further comprising a range specifying means which specifies a detection range of the lane mark in the image acquired by the image acquisition means,
wherein the complexity calculation means calculates the complexity for the detection range specified by the range specifying means in the image acquired by the image acquisition means.

7. A vehicle comprising:
an imaging means;
an image acquisition means which acquires an image of a road via the imaging means;
a lane recognition means which detects a lane mark on the road from the image acquired by the image acquisition means and recognizes a lane along which the vehicle travels from the detected lane mark;
an actuator which drives a steering mechanism capable of steering a steering wheel of the vehicle;
a steering assistance means which performs steering assistance processing for driving the actuator so that the vehicle travels along the lane recognized by the lane recognition means;
a side displacement amount calculation means which calculates a displacement amount in the lane width direction between the position of the vehicle and the center of the lane recognized by the lane recognition means by dividing a distance in the lane width direction between the vehicle and the center of the lane recognized by the lane recognition means by lane width of the recognized lane;
a complexity calculation means which calculates the complexity of the image acquired by the image acquisition means; and
a steering assistance inhibition means which inhibits the steering assistance processing based on the calculated displacement amount and the calculated complexity of the acquired image.

8. The vehicle according to claim 7, wherein the steering assistance inhibition means inhibits the steering assistance processing upon determining at a time point:
the calculated displacement amount is greater than a first predetermined value representing the lane is recognized incorrectly, and
the calculated complexity of the acquired image is greater than a second predetermined value representing a structure in a vicinity of the lane mark and incorrectly recognized as a part of the lane.

9. The vehicle according to claim 7, wherein the complexity calculation means calculates the complexity by using at least one of a value indicating the density of edge points obtained by performing an edge extraction process for the image and a value indicating the number of edge points constituting a straight line among the edge points.

10. The vehicle according to claim 7, wherein the complexity calculation means calculates the complexity by multiplying a value indicating the density of edge points obtained by performing an edge extraction process for the image by a value indicating the number of edge points constituting a straight line among the edge points.

11. The vehicle according to claim 7, further comprising a range specifying means which specifies a detection range of the lane mark in the image acquired by the image acquisition means,
wherein the complexity calculation means calculates the complexity for the detection range specified by the range specifying means in the image acquired by the image acquisition means.

12. A steering control device for a vehicle, comprising:
an image acquisition means which acquires an image of a road via an imaging means mounted on the vehicle;
a lane recognition means which detects a lane mark on the road from the image acquired by the image acquisition means and recognizes a lane along which the vehicle travels from the detected lane mark;
an actuator which drives a steering mechanism capable of steering a steering wheel of the vehicle;
a steering assistance means which performs steering assistance processing for driving the actuator so that the vehicle travels along the lane recognized by the lane recognition means;
a side displacement amount calculation means which calculates a displacement amount in the lane width direction between the position of the vehicle and the center of the lane recognized by the lane recognition means by dividing a distance in the lane width direction between the position of the vehicle and the center of the lane recognize. by the lane recognition means by a lane width of the recognized lane; and a steering assistance inhibition means which inhibits the steering assistance processing based at least in part on the calculated displacement amount.

13. The steering control device for the vehicle according to claim 12, wherein the steering assistance inhibition means inhibits the steering assistance processing upon determining the calculated displacement amount at a time point is greater than a predetermined value representing the lane is recognized incorrectly.

14. A steering control device for a vehicle comprising:
an image acquisition means which acquires an image of a road via an imaging means mounted on the vehicle;
a lane recognition means which detects a lane mark on the road from the image acquired by the image acquisition means and recognizes a lane along which the vehicle travels from the detected lane mark;
an actuator which drives a steering mechanism capable of steering a steering wheel of the vehicle;
a steering assistance means which performs steering assistance processing for driving the actuator so that the vehicle travels along the lane recognized by the lane recognition means;
a complexity calculation means which calculates the complexity of the image acquired by the image acquisition means by using at least one of a value indicating the density of edge points obtained by performing an edge extraction process for the image and a value indicating the number of edge point constituting a straight line among the edge points; and
a steering assistance inhibition means which inhibits the steering assistance processing by the steering assistance means based at least in part on the calculated complexity of the acquired image.

15. The steering control device for the vehicle according to claim 14, wherein the steering assistance inhibition means inhibits the steering assistance processing by the steering assistance means upon determining the calculated complexity of the acquired image at a time point is greater than a predetermined value representing a structure in a vicinity of the lane mark and incorrectly recognized as a part of the lane.

16. The steering control device for the vehicle according to claim 14, wherein the complexity calculation means calculates the complexity by multiplying a value indicating the density of edge points obtained by performing an edge extraction process for the image by a value indicating the number of edge points constituting a straight line among the edge points.

17. The steering control device for the vehicle according to claim 14, further comprising a range specifying means which specifies a detection range of the lane mark in the image acquired by the image acquisition means,
wherein the complexity calculation means calculates the complexity for the detection range specified by the range specifying means in the image acquired by the image acquisition means.

18. A steering control device for a vehicle comprising:
an image acquisition means which acquires an image of a road via an imaging means mounted on the vehicle;
a lane recognition means which detects a lane mark on the road from the image acquired by the image acquisition means and recognizes a lane along which the vehicle travels from the detected lane mark;
an actuator which drives a steering mechanism capable of steering a steering wheel of the vehicle;
a steering assistance means which performs steering assistance processing for driving the actuator so that the vehicle travels along the lane recognized by the lane recognition means;
a side displacement amount calculation means which calculates a displacement amount in the lane width direction between the position of the vehicle and the center of the lane recognized by the lane recognition means by dividing a distance in the lane width direction between the position of the vehicle and the center of the lane recognized by the lane recognition means by a lane width of the recognized lane;
a complexity calculation means which calculates the complexity of the image acquired by the image acquisition means; and
a steering assistance inhibition means which inhibits the steering assistance processing based on the displacement amount the calculated complexity of the acquired image.

19. The steering control device for the vehicle according to claim 18, wherein the steering assistance inhibition means inhibits the steering assistance processing upon determining at a time point:
the calculated displacement amount is greater than a first predetermined value representing the lane is recognized incorrectly, and
the calculated complexity of the acquired image is greater than a second predetermined value representing a structure in a vicinity of the lane mark and incorrectly recognized as a part of the lane.

20. The steering control device for the vehicle according to claim 18, wherein the complexity calculation means calculates the complexity by using at least one of a value indicating the density of edge points obtained by performing an edge extraction process for the image and a value indicating the number of edge points constituting a straight line among the edge points.

21. The steering control device for the vehicle according to claim 18, wherein the complexity calculation means calculates the complexity by multiplying a value indicating the density of edge points obtained by performing an edge extraction process for the image by a value indicating the number of edge points constituting a straight line among the edge points.

22. The steering control device for the vehicle according to claim 18, further comprising a range specifying means which specifies a detection range of the lane mark in the image acquired by the image acquisition means,
wherein the complexity calculation means calculates the complexity for the detection range specified by the range specifying means in the image acquired by the image acquisition means.

* * * * *